(12) United States Patent
Khatib (10) Patent No.: US 9,096,101 B2
(45) Date of Patent: Aug. 4, 2015

(54) RUN FLAT TIRE AND SYSTEM

(75) Inventor: Khaled Khatib, Lewiston, NY (US)

(73) Assignee: HUTCHINSON INDUSTRIES, INC., Trenton, NJ (US)

( * ) Notice: Subject to any disclaimer, the term of this patent is extended or adjusted under 35 U.S.C. 154(b) by 0 days.

(21) Appl. No.: 13/217,419

(22) Filed: Aug. 25, 2011

(65) Prior Publication Data

US 2011/0303335 A1    Dec. 15, 2011

Related U.S. Application Data

(63) Continuation of application No. 12/084,156, filed as application No. PCT/US2007/026037 on Dec. 20, 2007, now Pat. No. 8,118,072.

(60) Provisional application No. 60/919,426, filed on Mar. 22, 2007.

(51) Int. Cl.
*B60C 17/04* (2006.01)
*B60C 17/06* (2006.01)
*B60C 15/028* (2006.01)

(52) U.S. Cl.
CPC .............. *B60C 17/06* (2013.01); *B60C 15/028* (2013.01); *B60C 17/041* (2013.04); *Y10T 152/10009* (2015.01)

(58) Field of Classification Search
CPC ................................ B60C 17/00; B60C 17/04
See application file for complete search history.

(56) References Cited

U.S. PATENT DOCUMENTS

| 3,528,472 | A | * | 9/1970 | Kubach | 152/158 |
| RE28,196 | E | * | 10/1974 | Patecell | 152/158 |
| 6,840,294 | B2 | * | 1/2005 | Kuramori et al. | 152/156 |

FOREIGN PATENT DOCUMENTS

| GB | 2191453 | * | 12/1987 |
| JP | 10-211807 | * | 8/1998 |
| WO | WO 03106198 | * | 12/2003 |

* cited by examiner

*Primary Examiner* — Justin Fischer
(74) *Attorney, Agent, or Firm* — K&L Gates LLP (57) ABSTRACT

An improved run flat tire and system for use with a two-piece or multi-piece wheel and tire to provide for continued operation of vehicles after tire deflation. Certain aspects of the invention include a plurality of arcuate sections releasably aligned and secured to each other for positioning around a wheel, wherein extended lip portions of each arcuate section extend laterally from the inner base portion of each arcuate section to limit lateral movement of the run flat device relative to the wheel.

10 Claims, 8 Drawing Sheets

RUN FLAT TIRE AND SYSTEM

PRIORITY CLAIM

The present application is a continuation of co-pending U.S. patent application Ser. No. 12/084,156, filed Apr. 24, 2008, which is a U.S. National Stage application of International Application No. PCT/US2007/026037, filed Dec. 20, 2007, which claims the benefit of U.S. Provisional Application Ser. No. 60/919,426, filed Mar. 22, 2007.

TECHNICAL FIELD

The present invention relates to a run flat tire device and system and, more specifically, to an improved run flat tire with bead lock capabilities.

BACKGROUND OF THE INVENTION

Run flat tire systems are used on automobiles, commercial vehicles and military vehicles, among others, to provide for continued operation of vehicles (often at reduced speeds and for limited distances) after a tire blow out, reduced tire pressure or other tire damage.

SUMMARY OF THE INVENTION

The present invention is an improved run flat device and system. In one aspect, the invention has bead lock capabilities for fitment on a two-piece wheel. In another aspect of the invention, the run flat device and system includes an extended lip or flange on each side of the main body portion of the run flat which, among other things, allows the system to retain both tire beads against corresponding wheel flanges. In another aspect, the run flat device has three sections. In another aspect, those sections are connected by aligning corresponding openings in each section and securing the sections together by nut and bolt or other securing hardware. The extended lip feature improves the performance of the run flat system, especially for mobility when driving through soft ground like sand. The bead retainers maintain the tire bead against the wheel flange/margins, so as to provide or ensure better mobility and/or tire traction when running on soft ground.

Among other things, the improved new run flat device and system features:
1. A static run flat device/system with an extended lip on each side of the side surface of the main body portion of the run flat to maintain the bead against the wheel flange/margins.
2. In another aspect, the device/system consists of two or three sections that get mounted around the wheel and the sections are connected together and tightened around the two-piece wheel using metal hardware.
3. In another aspect, the annular section of the run flat device/system is positioned in the middle or recess of the wheel.
4. In yet another aspect, the extended radial face and back of the main body portion of the run flat device is a flat surface.
5. In another aspect, the device/system is made of 100% composite material (e.g. Polyester base).

The invention may be manufactured through the use of a mold. By way of example, the run flat device/system may be manufactured by extrusion (e.g. through a conventional or general purpose extruder), by melt casting or by injection molding, among other methods. For example, raw material in the form of plastic pellets may be introduced into a hopper; thereafter, the plastic pellets may be heated and homogenized in an extruder until they become fluid enough to inject into a mold; whereupon the fluid plastic is pushed from the extruder by feed screws through a die and into a mold.

In addition to providing an improved run flat tire device and system, some of the benefits and objectives of the present invention are as follows:
1. Locking of tire bead(s) to provide superior off road mobility and vehicle handling;
2. Improved capability for handling of heavy vehicle load(s);
3. Assistance/improvement in maintaining the tire in good condition during run flat mode (i.e. operation of the vehicle after a blow out or other damage to the tire);
4. Improved installation process. The installation process is significantly simpler than the prior art and systems currently available in the marketplace. No special equipment is needed to install this run flat tire device/system, while other systems require specialized and costly installation equipment.
5. The device and system of the present invention may be mounted and demounted or dismounted in the field.
6. The device and system of the present invention is lighter in weight than prior art systems by virtue of its design.

These and other objects and advantages will become apparent from the foregoing and ongoing written specification, the accompanying drawings and the appended claims.

DESCRIPTION OF THE PREFERRED EMBODIMENTS

At the outset, it should be clearly understood that like reference numerals are intended to identify the same parts, elements or portions consistently throughout the several drawing figures, as such parts, elements or portions may be further described or explained by the entire written specification, of which this detailed description is an integral part. The following description of the preferred embodiments of the present invention are exemplary in nature and are not intended to restrict the scope of the present invention, the manner in which the various aspects of this invention may be implemented, or their applications or uses. A preferred embodiment of the run flat system and device consists of arcuate run flat portions or sections assembled around a wheel or rim drop center, which arcuate portions are fastened together with nuts and bolts. Other hardware, including that described below, may also be used. This embodiment is a lightweight design with a bead retainer for operating with high performance vehicles among others. Installation of this system and device is simple with the use of standard tire tools. The multiple piece design makes it easily mountable and demountable in the field of vehicle operation.

Figure 1:
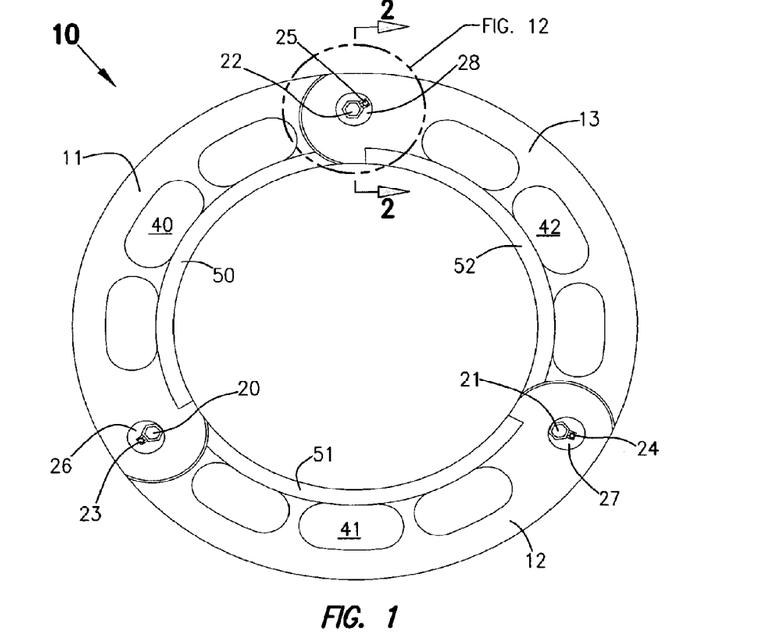
FIG. 1 is an illustration of a side view of a preferred embodiment of the present invention.

Referring now to the drawings, FIG. 1 is a side view of a preferred embodiment of the run flat device 10 of the present invention. In this embodiment, three arcuate sections 11, 12, 13 are connected with nuts, bolts 20, 21, 22, screws 23, 24, 25 and offset or recessed washers 26, 27, 28, which arcuate sections are releasably aligned and connected to form a run flat device suitable for installation around a tire rim drop center. FIG. 1 also illustrates extended lip or flange portions 50, 51, 52 which extend laterally from the base of each of the arcuate sections 11, 12, 13, and exemplary depressions 40, 41, 42 in each of the arcuate sections. The base portion of each arcuate section from which the extended lips extend is referred to as the "inner base portion." The invention is not limited to a run flat tire having three sections, but may have two sections or more than three sections.

Figure 2:
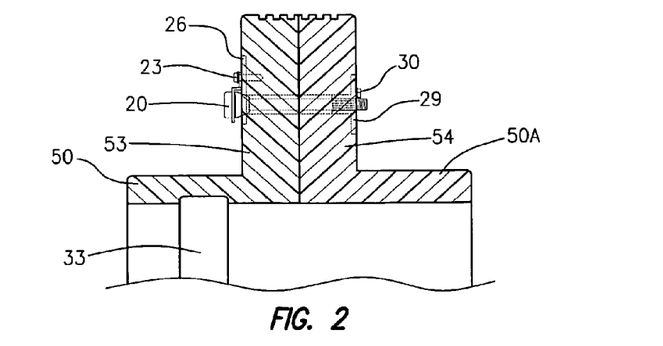
FIG. 2 is a cross-sectional view of a portion of the preferred embodiment illustrated in FIG. 1.
Figure 3:
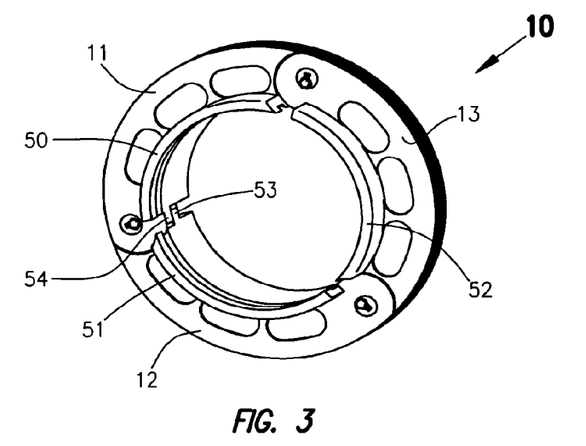
FIG. 3 is a perspective view of the preferred embodiment illustrated in FIG. 1.
Figure 4:
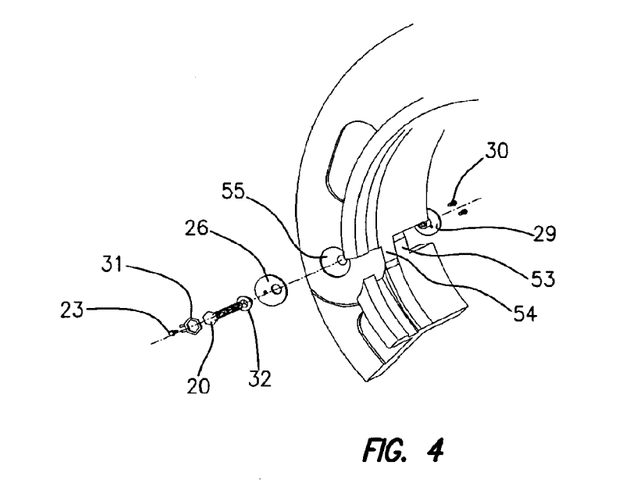
FIG. 4 is a perspective view of the connection between two arcuate sections in a preferred embodiment.

FIG. 2 is a cross-sectional view of the run flat device of the embodiment illustrated in FIG. 1 which illustrates a bolt 20 and screw 23, as well as a threaded nut portion 29 which accepts the bolt 20 and a screw 30 which holds the nut portion in place. FIG. 2 further illustrates a cross-section of two corresponding extended lip portions 50, 50A which are configured so as to abut corresponding tire beads which in turn abut corresponding wheel flanges thereby limiting or preventing lateral movement. The washer portion 26 as well as a cross-section of the connecting portions 53, 54 of the main body portion of two arcuate sections are also illustrated. In a preferred embodiment, the invention may include a channel 33 for an air valve in one or more arcuate sections. Referring now to FIG. 3, a perspective view of the preferred embodiment of the run flat device number 10 illustrated in FIG. 1 is shown. This figure illustrates the extended lips 50, 51, 52, as well as the connecting portions 53, 54 of two adjacent arcuate sections 11, 12. FIG. 4 is an exploded view of the connecting area, in this preferred embodiment, between two arcuate sections. A bolt 20 extends through a first washer 32, a second washer 26 and an opening in one of the arcuate sections. In this embodiment, the washer 26 fits in a depression 55 in one arcuate section, and the bolt engages a hex locking clip 31 which is held in position by a screw 23. In this embodiment, the bolt extends through a threaded nut portion 29 which is held by one or more additional screws 30.

Figure 5:
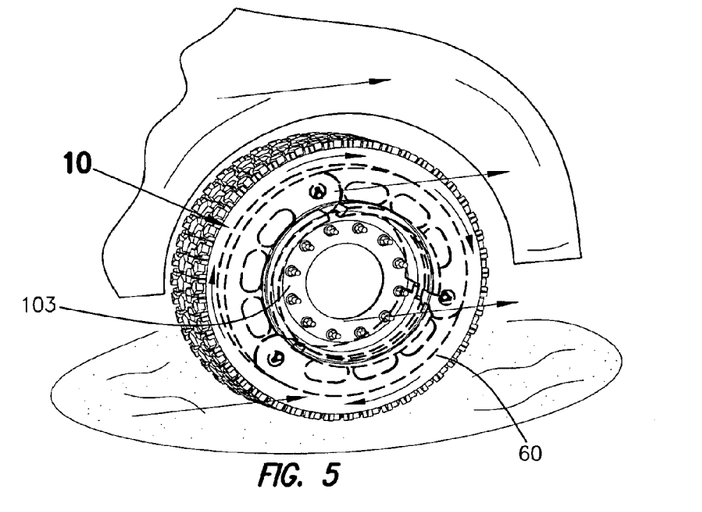
FIG. 5 is an illustration of a preferred embodiment as used with an inflated tire.
Figure 6:
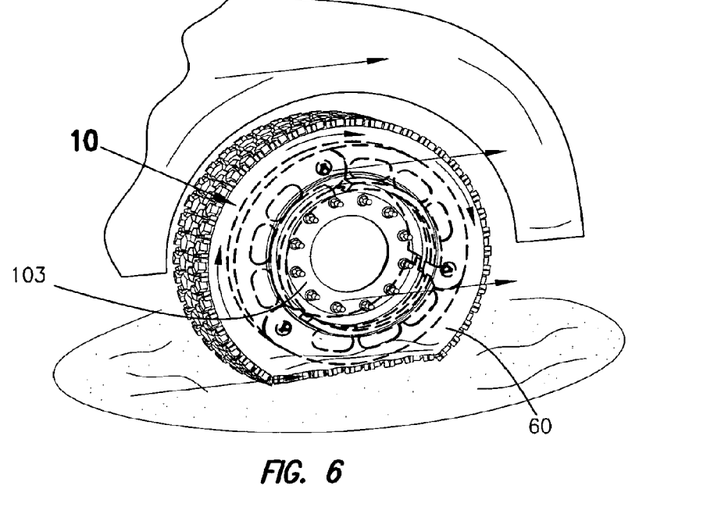
FIG. 6 is an illustration of a preferred embodiment as used with a deflated tire.
Figure 7:
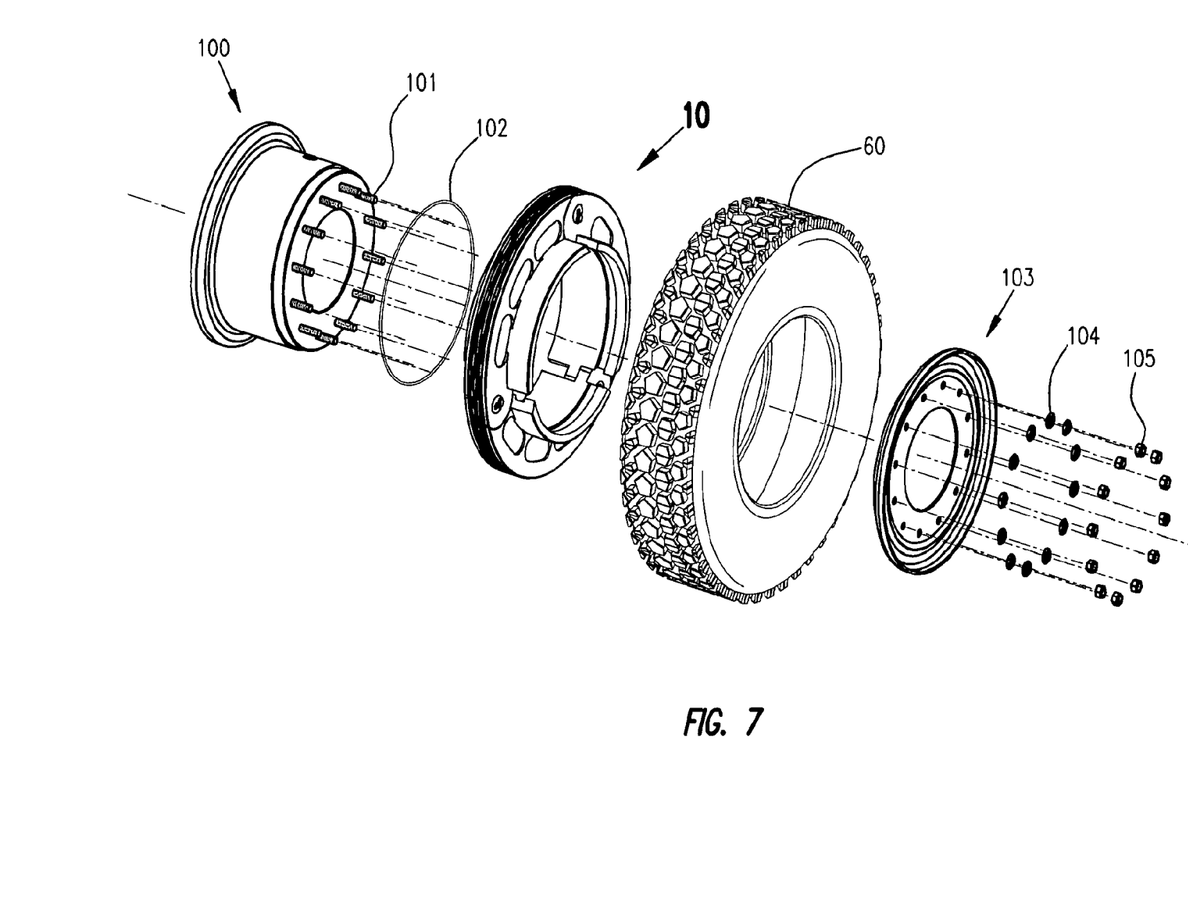
FIG. 7 is a perspective view of a preferred embodiment of the run flat tire, a wheel and a tire.

Referring now to FIG. 5, the run flat device 10 of this preferred embodiment is shown (in dashed lines) as used with a wheel 103 and tire 60. FIG. 6 shows the operation of the run flat device 10 when the tire 60 is deflated. FIG. 7 is an exploded view of the run flat tire device 10, as connected to a two-piece wheel 103 and a tire 60. Tire bolts 101, a rubber ring 102 to seal the two halves 100, 103 of the wheel, washers 104 and nuts 105 are also depicted.

Figure 8:
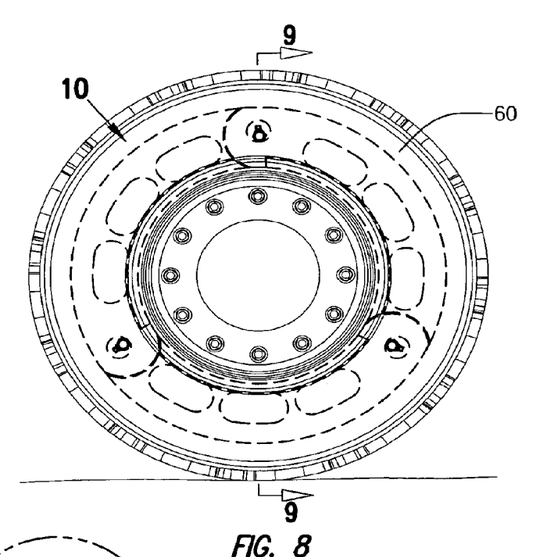
FIG. 8 is a side view of a preferred embodiment of the present invention illustrating a run flat tire, a wheel and a tire.
Figure 9:
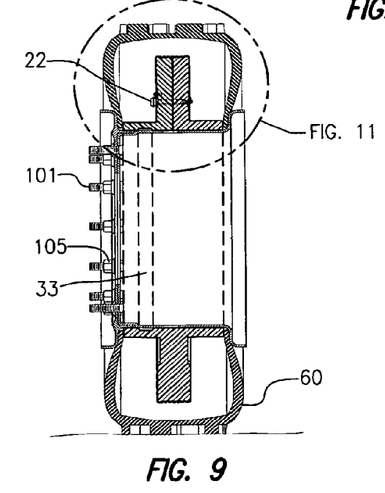
FIG. 9 is a cross-sectional view of the preferred embodiment illustrated in FIG. 8.
Figure 10:
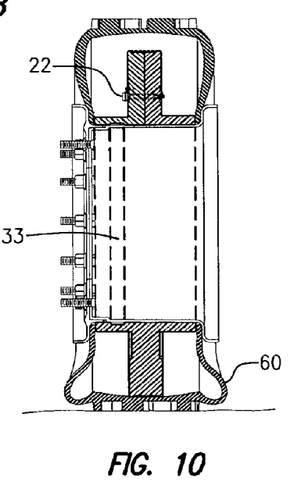
FIG. 10 is a cross-sectional view of the preferred embodiment illustrated in FIG. 8, with a deflated tire.
Figure 11:
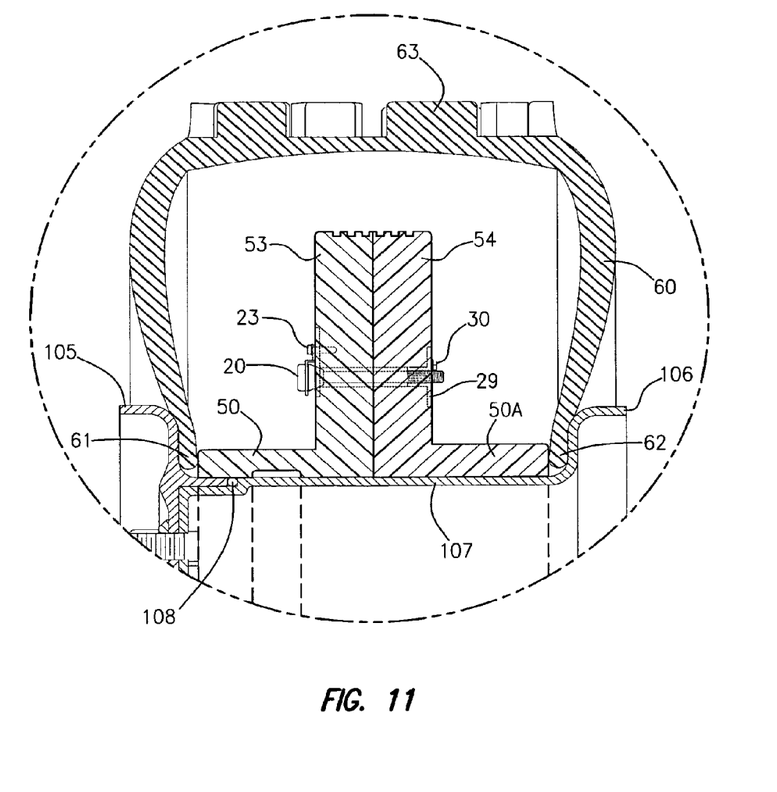
FIG. 11 is an expanded view of the top portion of the preferred embodiment illustrated in FIG. 9.

Referring now to FIG. 9, the run flat device 10 of the preferred embodiment is shown (in dashed lines) as used inside a rubber tire 60. FIGS. 9 and 10 are cross-sectional views of the preferred embodiment illustrated in FIG. 8, one with an inflated tire (FIG. 9) and one with a deflated tire (FIG. 10). In a preferred embodiment, the main body portion of the arcuate sections extends about 75% of the height of the tire relative to the drop center of the wheel. FIGS. 9 and 10 also show the air valve channel 33 of a preferred embodiment. FIG. 11 is an expanded view of the cross-section illustrated in FIG. 9, which also illustrates the tire treads 63, the wheel flanges 105, 106 and the tire beads 61, 62. In addition, FIG. 11 depicts the base or drop center 107 of the wheel, and an O-ring rubber seal 108, which is used to seal a two-piece wheel. The invention may also be used with a multi-part wheel.

Figure 12:
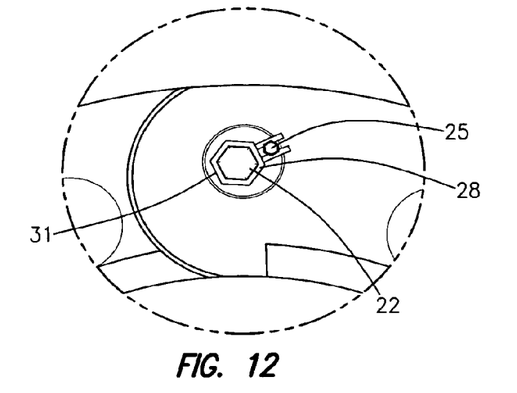
FIG. 12 is an expanded view of components of the connection mechanism of a preferred embodiment of the present invention.
Figure 13:
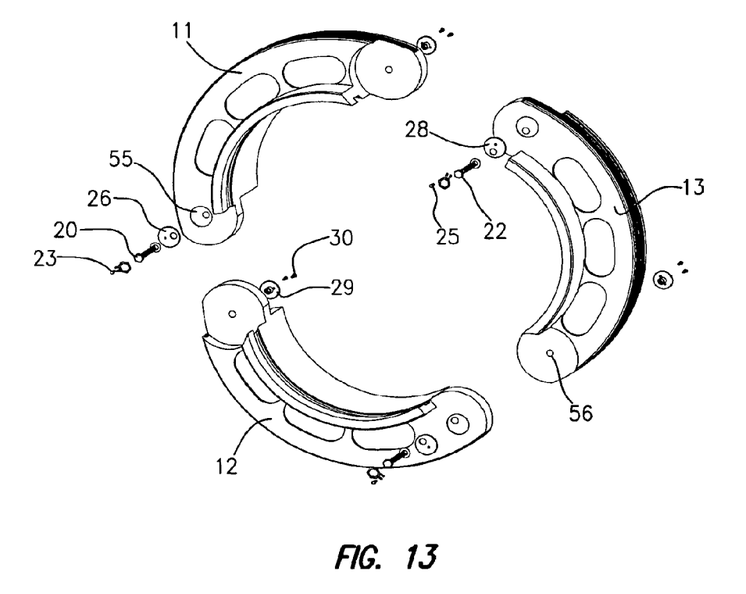
FIG. 13 is a perspective view of a preferred embodiment of the present invention wherein 3 arcuate sections are illustrated independently.
Figure 14:
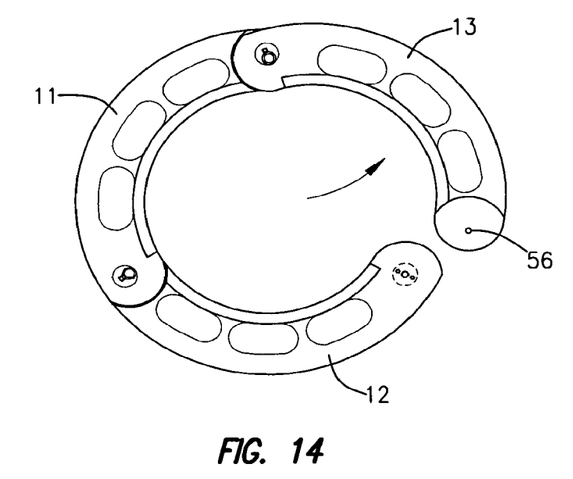
FIG. 14 is a side view of a preferred embodiment of the present invention.

FIG. 12 is an expanded view of a portion of the connection assembly or connection area illustrated in FIG. 1, which illustrates the bolt 22, screw 25, washer 28 and hex locking clip 31. FIG. 13 is an exploded perspective view of a run flat device showing the various connection components described above. FIG. 14 is a side view of the run flat device which shows the motion of disconnecting one of the arcuate sections 13 from another 12, and an opening 56 in one section through which a bolt may be passed to secure the two adjacent/corresponding portions.

In certain aspects of the preferred embodiment, three arcuate sections are assembled around the rim drop center of a tire, and may be configured and arranged to operate with high performance vehicles with central tire inflation systems (CTI). The inner circumference of the run flat device 10 may be designed and configured (by way of a mold fitted to the wheel or by machining, for example) so as to correspond to the profile of the wheel drop center to further reduce or eliminate lateral movement. In addition, the outer circumference of the run flat device, which comes into contact with a tire when the tire is deflated, may include a plurality of parallel circumferential channels or ribs, as shown at the top of the main body portion in the example illustrated in FIG. 11. These channels aid in maintaining lubricant on the outer surface of the run flat device to reduce friction and heat, and also to assist with traction and vehicle mobility.

The method of installation of the run flat tire in a preferred embodiment is described hereafter. First, a high temperature lubricant may be applied on the wall of a tire. Second, each arcuate section of the run flat tire device and system is inserted inside the tire. Another step of the installation process includes aligning the separate sections of the run flat device and system inside the tire and connecting such sections with nuts and bolts (or another mechanism for connection of aligned openings) in the respective sections of the run flat device. A further step is centering the run flat relative to the opening in the tire. The tire with run flat as assembled is placed over the bottom half of a wheel 100. The assembled parts are then pushed or pressed so that the bottom tire bead is seated against a wheel flange and the run flat device/system is located in the corresponding area in the wheel drop center. A further step includes tightening the nuts and bolts in the run flat tire. Finally, the top part 103 of the wheel corresponding to the bottom part is pressed into the opening of the run flat and against the surface of the bottom half of the wheel and secured. Very few tools are required to mount, install, demount and uninstall the preferred embodiment. The configuration and assembly process allow for simple mounting and demounting in the field of vehicle operation without the need for expensive tools or other devices.

In one preferred embodiment, the run flat tire comprises HYTREL 5556, HYTREL 7246, CRASTIN SK605 and CRASTIN ST820. In anther embodiment, the foregoing materials are included in the following proportions: about 43% HYTREL 5556; about 15% HYTREL 7246; about 11% CRASTIN SK605; and about 31% CRASTIN ST820.

In a preferred embodiment, the run flat system may be manufactured through the use of a mold through an extrusion process (e.g. through a conventional or general purpose extruder). Raw material in the form of plastic pellets, such as the material described in the previous paragraph, may be introduced into a hopper; thereafter, the plastic pellets may be heated and homogenized in an extruder until they become fluid enough to inject into a mold; whereupon the fluid plastic is pushed from the extruder by feed screws through a die and into a mold, where the material hardens.

While there has been described what is believed to be one preferred embodiment of the present invention, those skilled in the art will recognize that other and further changes and modifications may be made thereto without departing from the spirit of the invention. Therefore, the invention is not limited to the specific details and representative embodiments shown and described herein. The terminology and phraseology used herein is for purposes of description and should not be regarded as limiting. Accordingly, persons skilled in this art will readily appreciate that various additional changes and modifications may be made without departing from the spirit or scope of the invention.

What is claimed is:

1. A system, comprising:
    a wheel having a first flange, a second flange and a drop center;
    a tire mounted on the wheel, wherein the tire comprises a first tire bead and a second tire bead, wherein the first tire bead is against the first flange and the second tire bead is against the second flange; and
    a run flat device, wherein the run flat device comprises a plurality of complementary, load bearing arcuate portions, wherein each of the arcuate portions comprises a base portion and a main body portion formed integral with the base portion;
    wherein each of the base portions comprises a first lip portion, an inner base portion and a second lip portion;
    wherein each of the base portions abuts the drop center;
    wherein each of the base portions extends from the first tire bead to the second tire bead;
    wherein each main body portion extends radially outward from the corresponding base portion;
    wherein each arcuate portion is releasably connected to an adjoining arcuate portion by a bolt which extends through overlapping portions of the connected arcuate portions;
    wherein the plurality of arcuate portions form a continuous ring around said wheel drop center; and
    wherein the bolt extends through the overlapping portions of the connected arcuate portions in a direction substantially perpendicular to a circumferential direction of the continuous ring of arcuate portions.

2. The system of claim 1, wherein a radially outermost surface of at least one of the main body portions defines at least three circumferential channels.

3. The system of claim 1, wherein a radially innermost surface of at least one of said arcuate portions is complementary to a radially outermost surface of the drop center.

4. The system of claim 1, wherein at least one of said arcuate portions comprise a polyester-based composite material.

5. The system of claim 1, further comprising a locking clip which surrounds the bolt.

6. A system, comprising:
    a wheel, wherein the wheel comprises a first flange portion, a second flange portion, and drop center portion between the first and second flange portions;
    a tire mounted on the wheel, wherein the tire comprises a first tire bead and a second tire bead, wherein the first tire bead is adjacent the first flange portion and the second tire bead is adjacent the second flange portion; and
    a run flat device positioned on the drop center portion of the wheel, wherein the run flat device comprises a plurality of arcuate sections, wherein each of the arcuate sections comprises:
        a base portion, wherein the base portion is on the drop center portion and extends from an interior surface of the first tire bead to an interior surface of the second tire bead; and
        a body portion formed integral with the base portion, wherein the body portion extends radially outward from the base portion, and wherein a radially outermost surface of the body portion defines at least three circumferential grooves;
    wherein a first arcuate section overlaps a second arcuate section and is connected to the second arcuate section by a fastener which extends through the first and second arcuate sections in a direction substantially perpendicular to a circumferential direction of the tire.

7. The system of claim 6, wherein a radially innermost surface of the first arcuate section is complementary to a radially outermost surface of the drop center portion.

8. The system of claim 6, wherein the run flat device comprises a polyester-based composite material.

9. The system of claim 6, further comprising a locking clip which surrounds the bolt.

10. The system of claim 6, wherein the run flat device surrounds the drop center portion of the wheel.

* * * * *